United States Patent [19]
Baba

[11] Patent Number: 5,628,206
[45] Date of Patent: May 13, 1997

[54] REFRIGERANT CONDENSER

[75] Inventor: Norimasa Baba, Nagoya, Japan

[73] Assignee: Nippondenso Co., Ltd., Kariya, Japan

[21] Appl. No.: 414,384

[22] Filed: Mar. 31, 1995

[30] Foreign Application Priority Data

Apr. 1, 1994 [JP] Japan .................. 6-065056

[51] Int. Cl.$^6$ .................. F25B 39/04; F25D 19/00; F28F 7/00
[52] U.S. Cl. .................. 62/507; 62/298; 62/509; 165/76
[58] Field of Search .................. 62/507, 509, 298; 165/76, 132, 138

[56] References Cited

U.S. PATENT DOCUMENTS

| | | | |
|---|---|---|---|
| 4,972,683 | 11/1990 | Beatenbough | 62/507 |
| 5,088,294 | 2/1992 | Ando | 62/509 |
| 5,228,315 | 7/1993 | Nagasaka et al. | 62/509 |

FOREIGN PATENT DOCUMENTS

| | | | |
|---|---|---|---|
| 2267478 | 11/1990 | Japan . | |
| 4320771 | 11/1992 | Japan . | |
| 9411686 | 5/1994 | WIPO | 62/507 |

*Primary Examiner*—William Doerrler
*Attorney, Agent, or Firm*—Cushman, Darby & Cushman IP group of Pillsbury Madison & Sutro LLP

[57] ABSTRACT

A square shaped upper side level difference and a squarely annular lower side level difference part are provided on a reverse arc shaped recess part formed in the modulator, and a second through hole is provided so as to bore through the lower side level difference part. By this arrangement, in brazing the modulator to an arc shaped projection part formed on the right side header, heated and melted brazing material can intensively flow into the surface contacting part between the surface of the upper side level difference part and the surface of the projection part and between the surface of the lower side level difference part and the surface of the projection part. As a result, the right side header and the modulator can exactly be brazed and therefore there is no possibility of the occurrence of defective brazing around the second through hole.

18 Claims, 8 Drawing Sheets

5,628,206

REFRIGERANT CONDENSER

CROSS REFERENCE TO RELATED APPLICATIONS

This application is based upon and claims priority from Japanese Patent Application No. Hei 6-65056 filed Apr. 1, 1994, the contents of the document are incorporated herein by reference.

BACKGROUND OF THE INVENTION

1. Field of the Invention

The present invention generally relates to a refrigerant condenser. More particularly, the present invention relates to a refrigerant condenser such as a modulator integrated-type refrigerant condenser to be incorporated into a refrigerating cycle of an air conditioner, a refrigerator or a freezer.

2. Description of Related Art

Conventionally, as disclosed in the Japanese Unexamined Patent Publication No. Hei 4-320771, for example, a technique for forming a modulator integrated type refrigerant condenser has been known in which a roughly cylindrical header and a roughly cylindrical modulator of a refrigerant condenser are laid out in parallel with each other in the width direction of a core (longitudinal direction of a plurality of tubes) and joined by brazing by holding a flat part formed on the roughly cylindrical header of the refrigerant condenser to a flat part of the roughly cylindrical modulator thereof in surface contact with each other.

In this case, a brazing material has already been applied to the surface of the header and the surface of the modulator, and flux is applied to the surface of the header and the surface of the modulator before brazing, so that the flux activates (facilitates the flowing of) the brazing material in brazing within a heating furnace for joining.

However, according to the above prior art, unevenness is easily caused to flux application or the size of clearances between the flat part of the header and the flat part of the modulator in overall brazing of the flat part of the header and the flat part of the modulator. Therefore, it is difficult to satisfy the requirement for uniform brazing, and defective brazing (void) may easily be caused in places. As a result, there is a problem that refrigerant leaks when the void is caused particularly near a through hole communicating the inside of the module and the inside of the header.

SUMMARY OF THE INVENTION

In view of the above, an object of the present invention is to provide a refrigerant condenser which can prevent the leakage of refrigerant by exactly brazing those places where defective brazing would pose a serious problem.

One preferred mode of the present invention has employed a technical means comprising a first pipe body having a joining part in a longitudinal direction thereof and a first through hole penetrating an inner periphery side and outer periphery side of the joining part, and a second pipe body having a joined part joined to said joining part of said first pipe body by brazing, a second through hole penetrating an inner periphery side and outer periphery side of said joined part and communicating with said first through hole, and a level difference part performing surface contact with said joining part of said first pipe body around at least said second through holes.

According to one preferred mode of the present invention, a level difference part is provided so as to enclose at least the circumference of the second through hole among all the places of the joined part of the second pipe part. When the joined part of the second pipe body is contacted to the first pipe body, only the level difference part of the second pipe body comes into contact with the joining part of the first pipe body. When the joined part of the second pipe body is brazed to the joining part of the first pipe body, a part between the surface of the joining part of the first pipe body and the surface of the level difference part of the second pipe body, i.e., between the circumference of the first through hole in the first pipe body and the circumference of the second through hole in the second pipe body, can strongly be joined.

By the above arrangement, as defective brazing does not occur so easily at those places where defective brazing would pose a serious problem, i.e., the circumference of the first through hole in the first pipe body and the circumference of the second through hole in the second pipe body, it is possible to prevent the leakage of refrigerant from the joining part of the first pipe body and the joined part of the second pipe body.

DETAILED DESCRIPTION OF THE PRESENTLY PREFERRED EXEMPLARY EMBODIMENTS

A refrigerant condenser according to the present invention will now be described based on embodiments in which the refrigerant condenser is applied to a modulator integrated type refrigerant condenser to be incorporated into a refrigerating cycle of an automotive air conditioner.

[Construction of the First Embodiment]

Figure 1:
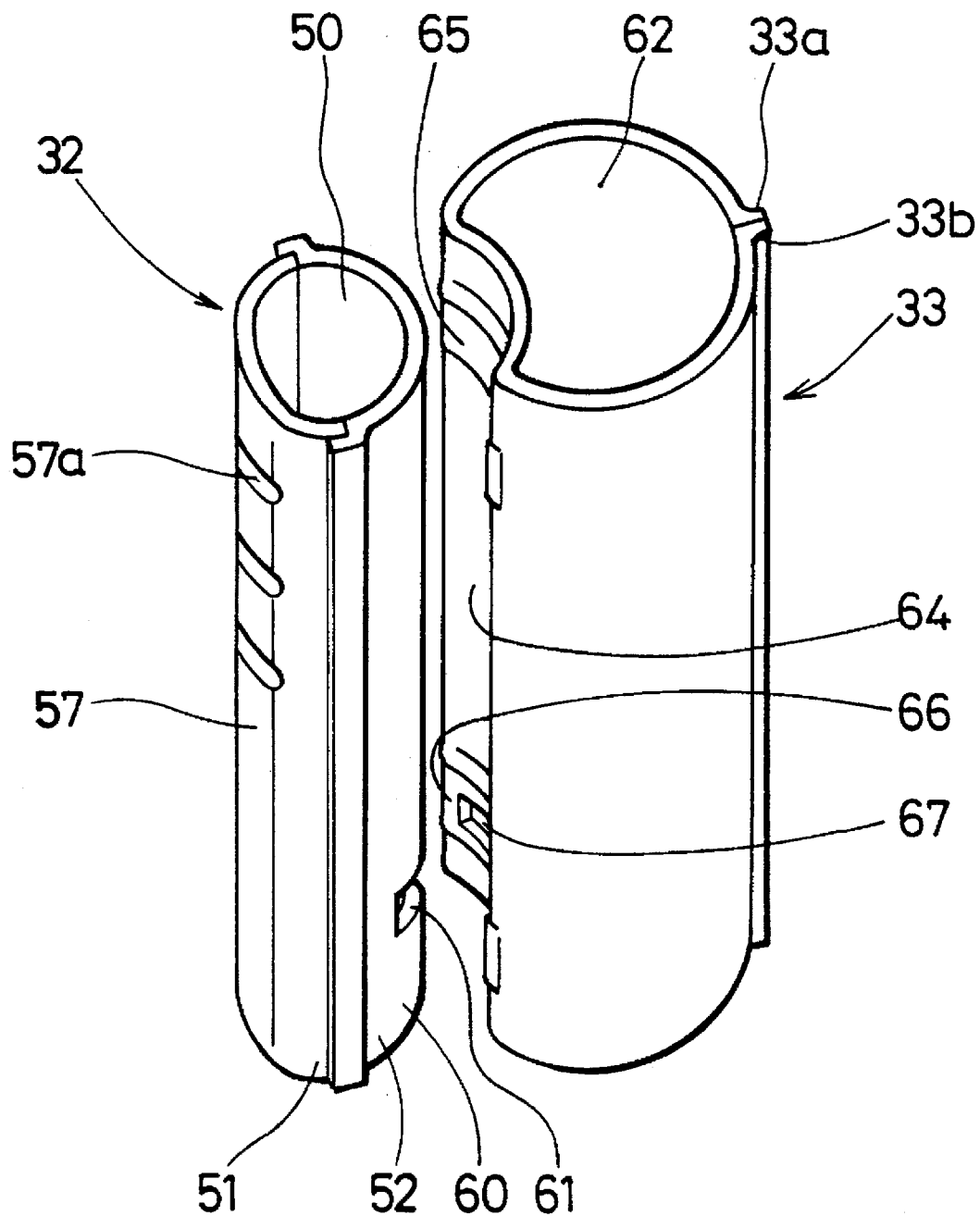
FIG. 1 is an exploded perspective view illustrating the right side header and modulator of the modulator integrated type refrigerant condenser of the first embodiment according to the present invention.
Figure 2:
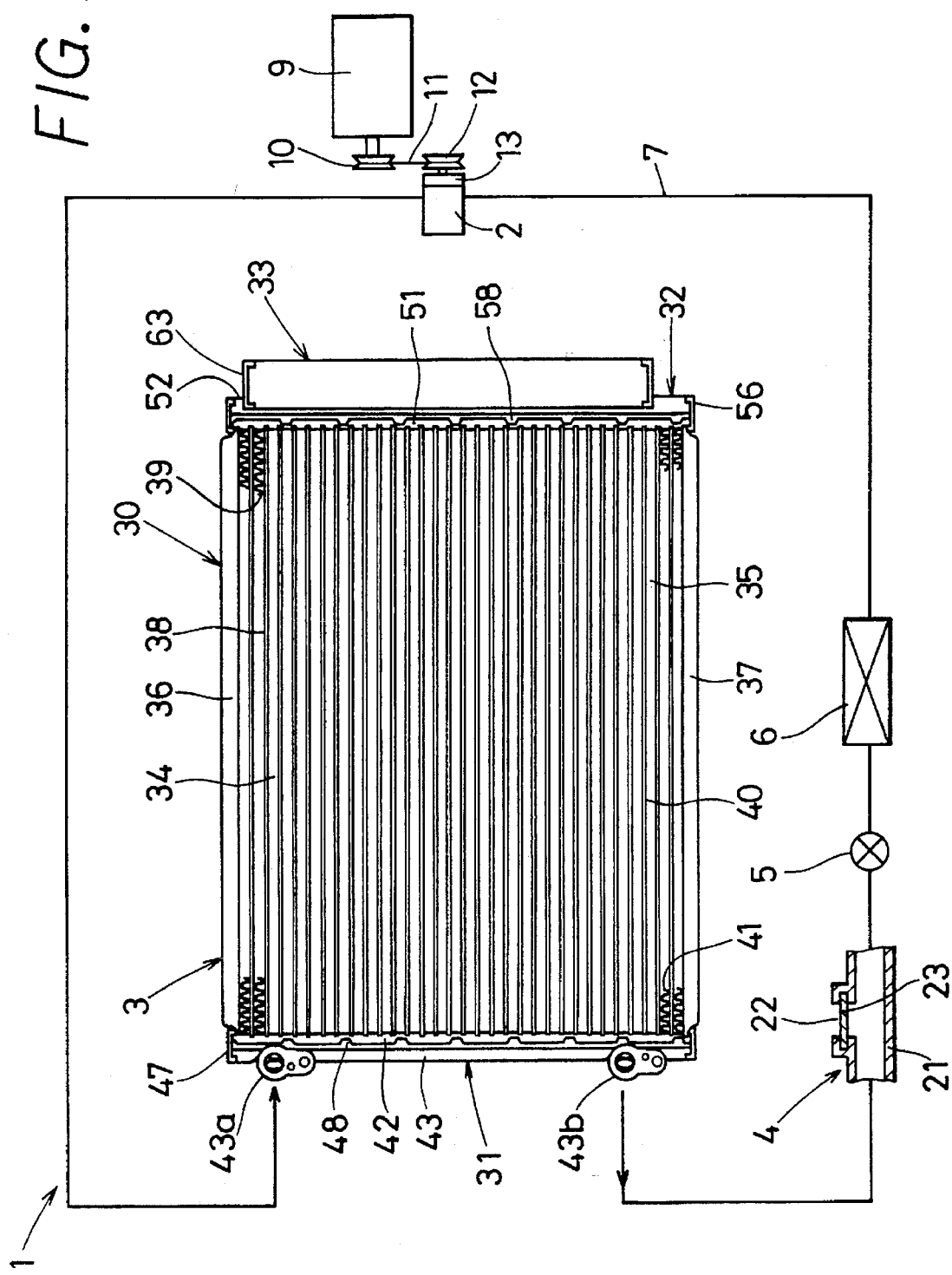
FIG. 2 is a constructional view illustrating the refrigerating cycle of the automotive air conditioner of the first embodiment according to the present invention.
Figure 3:
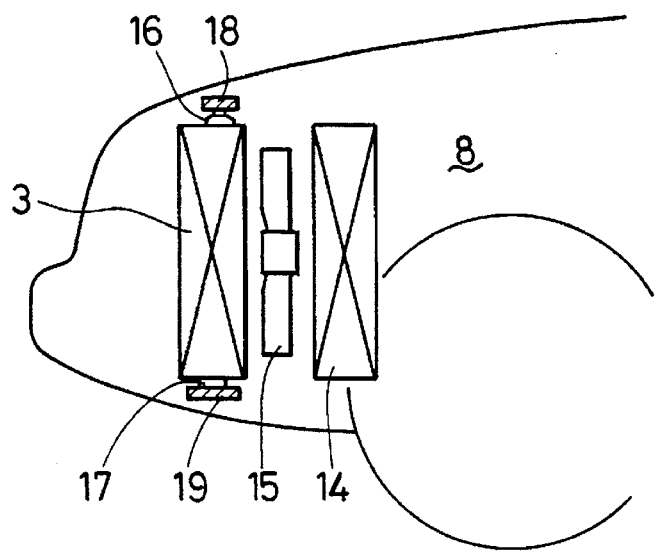
FIG. 3 is a cross-sectional view typically illustrating the condition of the modulator integrated type refrigerant condenser of the first embodiment according to the present invention mounted on a vehicle.
Figure 4:
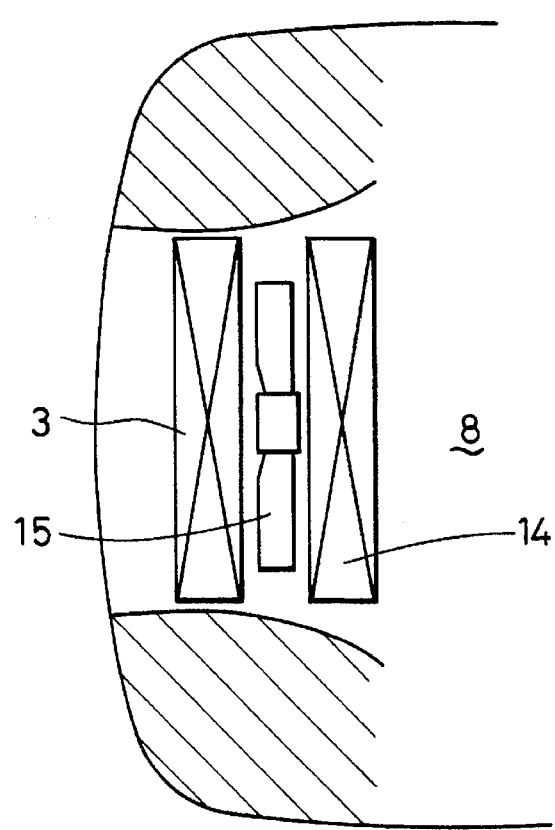
FIG. 4 is a plan view typically illustrating the condition of the modulator integrated type refrigerant condenser of the first embodiment according to the present invention mounted on a vehicle.

FIGS. 1 to 9 illustrate a first embodiment according to the present invention, wherein FIG. 1 illustrates a right side header and a modulator, FIG. 2 illustrates a refrigerating cycle of an automotive air conditioner, and FIGS. 3 and 4 typically illustrate the mounted condition of a modulator integrated type refrigerant condenser on a vehicle.

In a refrigerating cycle 1 of this automotive air conditioner, a refrigerant compressor 2, a modulator integrated type refrigerant condenser 3, a sight glass 4, an expansion valve 5 and a refrigerant evaporator 6 are sequentially and serially connected with a refrigerant pipe 7 which is made of a metal pipe, a rubber pipe or other material.

As illustrated in FIG. 2, the refrigerant compressor 2 is connected with an engine 9 disposed within an engine room 8 (FIGS. 3 and 4) of the vehicle through a pulley 10, a belt 11, a pulley 12 and an electromagnetic clutch 13. This refrigerant compressor 2 is a refrigerant compressing means such as a compressor which sucks gas refrigerant when the rotating power of the engine 9 is transmitted thereto and then compresses the gas refrigerant and discharge the high-temperature, high-pressure gas refrigerant.

As illustrated in FIG. 2, the modulator integrated type refrigerant condenser 3 is connected between the discharge port of the refrigerant compressor 2 and the inlet of the expansion valve 5 through the sight glass 4. As typically illustrated in FIGS. 3 and 4, this modulator integrated type refrigerant condenser 3 is disposed together with a radiator 14 and a cooling fan 15 within the engine room 8 of the vehicle in such a location where the modulator integrated type refrigerant condenser 3 can favorably receive the wind through a front grill (not illustrated) formed on the front side of the vehicle while the vehicle is running. The modulator integrated type refrigerant condenser 3 is mounted on stays 18 and 19 by means of mounting brackets 16 and 17 locked to the upper part and lower part thereof respectively.

As illustrated in FIG. 2, the sight glass 4 connected between the outlet of the modulator integrated type refrigerant condenser 3 and the inlet of the expansion valve 5 is a refrigerant condition observing means for observing the condition of the refrigerant circulating within the refrigerating cycle 1. This sight glass 4 is solely suspended from the refrigerant pipe 7 in some position within the engine room 8 of the vehicle, for example, where inspectors can easily observe the refrigerant condition from the refrigerant adjacent to the modulator integrated type refrigerant condenser 3.

Furthermore, as illustrated in FIG. 2, the sight glass 4 is composed of a round pipe like metal body 21 both ends of which are joined to the refrigerant pipe 7 by welding, fastening or other joining means and a deposited glass 23 fitted in an observation port 22 formed in the top of the metal body 21. Generally, when gas refrigerant containing bubbles is observed from the observation port 22, it means that the refrigerant quantity in circulation is not sufficient, and when gas refrigerant containing no bubbles is observed from the observation port 22, it means that the refrigerant quantity in circulation is appropriate.

Also as illustrated in FIG. 2, the expansion valve 5 connected between the outlet of the sight glass 4 and the inlet of the refrigerant evaporator 6 is a pressure reducing means for expanding the liquid refrigerant flowed therein by reducing the pressure thereof into gas-liquid two-phase refrigerant. In this embodiment, a thermostatic expansion valve which can automatically regulate the opening of the valve in such a way that the superheat of the refrigerant at the outlet of the refrigerant evaporator 6 is maintained at a specified value is used as the expansion valve 5. Instead of the expansion valve 5, other pressure reducing means such as a capillary tube or an orifice may also be used.

As illustrated in FIG. 2 again, the refrigerant evaporator 6 connected between the outlet of the expansion valve 5 and the suction port of the refrigerant compressor 2 is an evaporating means for evaporating and gasifying the gas-liquid two-phase refrigerant flowed therein by heat exchanging the refrigerant with the air blown therein from a blower (not illustrated).

Figure 5:
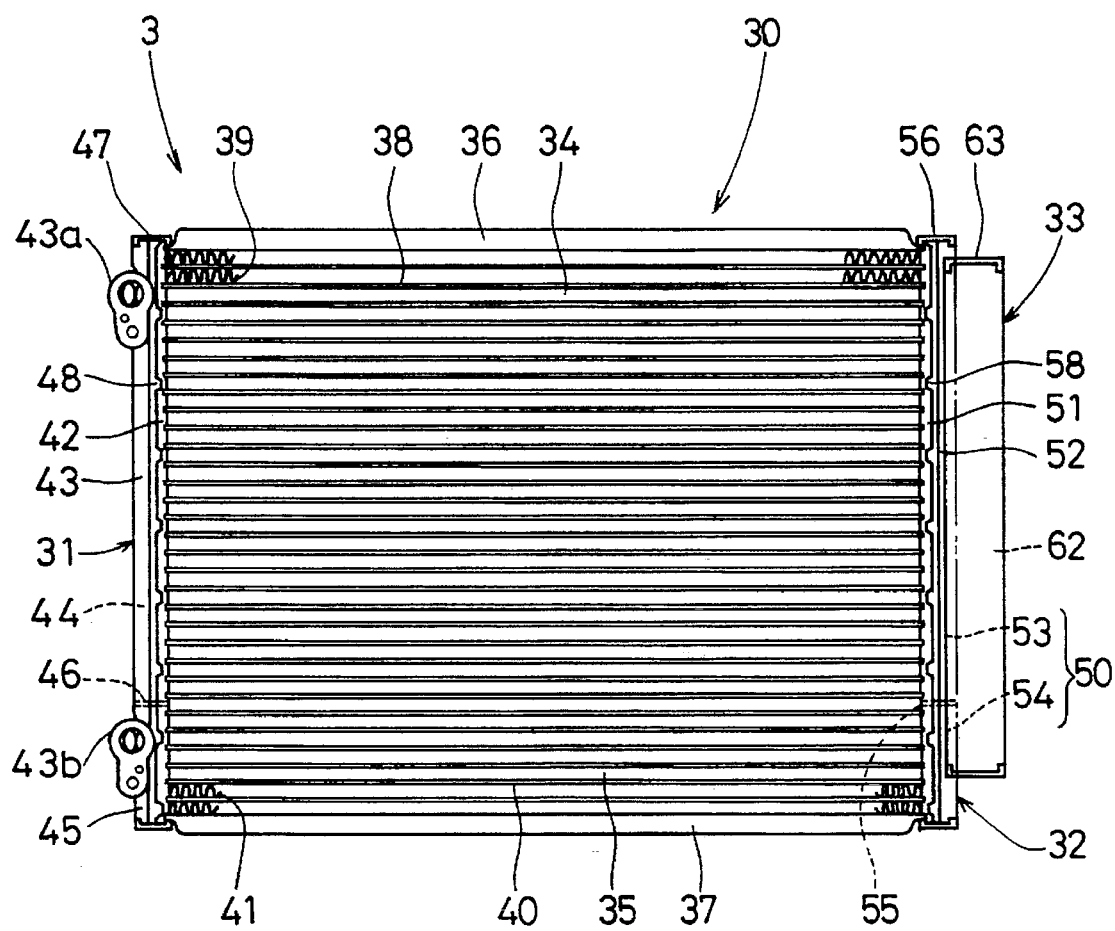
FIG. 5 is a front view illustrating the front side of the modulator integrated type refrigerant condenser of the first embodiment according to the present invention.

Next, the modulator integrated type refrigerant condenser 3 according to this embodiment will be described in detail referring to FIGS. 1 and 5 to 9. Here, FIG. 5 is a view illustrating the front surface side of the modulator integrated type refrigerant condenser 3 (windward side of the outdoor air flow). This modulator integrated type refrigerant condenser 3 is 300 to 500 mm in height dimension (top to bottom dimension or up and down dimension) and 300 to 600 mm in width dimension, for example.

The modulator integrated type refrigerant condenser 3 is composed of a core 30 for heat exchanging the refrigerant with the air, a left side header (inlet/outlet side header) 31 disposed on the left end side of the core 30 in the width direction thereof, a right side header (intermediate header) 32 disposed on the right end side of the core 30 in the width direction thereof, and a modulator 33 disposed on the opposite side of the side of the core 30 with respect to the right side header 32.

The core 30 is composed of a condensing part 34 and a supercooling part 35. To the upper end part and lower end part of the core 30 are joined side plates 36 and 37 respectively by brazing for use in locking the mounting brackets 16 and 17 (FIG. 3) to the respective stays 18 and 19 (FIG. 3) on the vehicle side. The side plates 36 and 37 are so formed as to be roughly U-shaped in cross section.

The condensing part 34 is composed of a plurality of condensing tubes 38 and a plurality of corrugate fins 39 which are joined to each other by brazing. This condensing part 34 is a condenser part which condenses and liquefies the high-temperature, high-pressure gas refrigerant flowed therein from the discharge port of the refrigerant compressor 2 by heat exchanging the refrigerant with the outdoor air as a heat medium blown by the cooling fan 15 (FIG. 3).

On the other hand, the supercooling part 35 is disposed in adjacency to and lower than the condensing part 34. This supercooling part 35 is composed of a plurality of supercooling tubes 40 and a plurality of corrugate fins 41 which are joined to each other by brazing. The supercooling part 35 is a subcooler part which supercools the high-temperature, high-pressure liquid refrigerant flowed therein from the right side header 32 by supercooling the refrigerant with the outdoor air as a heat medium blown by the cooling fan 15.

The plurality of condensing tubes 38 and the plurality of supercooling tubes 40 are horizontally disposed, forming refrigerant tube passages extending in the width direction of the core 30 and being flat and oval shaped in cross section. Within the plurality of condensing tubes 38 and plurality of supercooling tubes 40 are formed a plurality of refrigerant passages (not illustrated). The refrigerant flowing within the plurality of condensing tubes 38 horizontally flows from the left side header 31 to the right side header 32, while the refrigerant flowing within the plurality of supercooling tubes 40 horizontally flows from the right side header 32 to the left side header 31.

Incidentally, the plurality of condensing tubes 38 and the plurality of supercooling tubes 40 are horizontally disposed. In this embodiment, it is so arranged that the number of the condensing tubes 38 is larger than the number of the supercooling tubes 40. According to experiments, it is preferable that the number of the supercooling tubes 40 should be 15 to 20% of the number of all the tubes composing the core 30.

The plurality of corrugate fins 39 and 41 are joined mainly between the two condensing tubes 38 adjacent to each other and between the two supercooling tubes 40 adjacent to each other respectively by brazing. These corrugate fins 39 and 41 are so formed that the cross section thereof is of corrugated shape. These corrugate fins 39 and 41 are radiation fins for improving the radiation efficiency of the refrigerant flowing through the refrigerant passages formed therein.

The left side header 31 is a simply cylindrical pipe body having a third internal space (not illustrated) extending in the height direction of the core 30. The left side header 31 is composed of a header plate 42 connected to the left end part of the core 30 and being roughly U-shaped in cross section and a tank plate 43 connected to the opening side of the header plate 42 and being semi-arc shaped in cross section.

Within the left side header 31, i.e., within the third internal space, is joined a separator 46 being roughly disc shaped by brazing. This separator 46 is a dividing element for dividing the third internal space within the left side header 31 into an inlet side communication chamber 44 and an outlet side communication chamber 45.

Incidentally, the inlet side communication chamber 44 is communicated with the inlets of the plurality of condensing tubes 38, while the outlet side communication chamber 45 is communicated with the outlets of the plurality of supercooling tubes 40. Over the opening parts of the upper end part and lower end part of the left side header 31 are fitted disc shaped caps 47 respectively. These caps 47 are blockading means for blockading the opening parts of the upper end part and lower end part of the left side header 31.

In a side wall of the header plate on the side of the core 30, i.e., in the flat part (not illustrated) of the 42, are formed numerous through holes (not illustrated). Into the numerous through holes are plugged the inlet end parts of plurality of condensing tubes 38 and the outlet end parts of plurality of supercooling tubes 40. On the edge of the opening side of the tank plate 43 are partly formed a plurality of claw like engagement parts 48 for fixingly engaging the outside surface of the edge of the opening side of the header plate 42 by crimping, as illustrated in FIG. 5. To the back wall of the tank plate 43 are connected an inlet pipe 43a connected to the discharge port of the refrigerant compressor 2 and an outlet pipe 43b connected to the inlet of the sight glass 4 respectively.

The right side header 32 is a first pipe body according to the present invention. As illustrated in FIGS. 1 and 5, the right side header 32 is a simple, roughly cylindrical pipe body having a first internal space 50 expanding in the height direction of the core 30. The right side header 32 is composed of a header plate 51 connected to the right end part of the core 30 and being roughly U-shaped in cross section and a tank plate 52 connected to the opening side of this header plate 51 and being semi-arc shaped in cross section.

Within the right side header 32, i.e., within the first internal space 50, is joined a separator 55 of roughly disc shaped by brazing. This separator 55 is a partitioning means or a separating means according to the present invention and a dividing element for dividing the first internal space 50 into an upper communication chamber 53 and a lower communication chamber 54.

Incidentally, the upper communication chamber 53 is communicated with the outlets of the plurality of condensing tubes 38, while the lower communication chamber 54 is communicated with the inlets of the plurality of supercooling tubes 40. Over the opening parts of the upper end part and lower end part of the right side header 32 are fitted disc like caps 56 respectively. These disc like caps 56 are blockading means for blockading the opening parts of the upper end part and lower end part of the right side header 32 respectively.

In the side wall of the header plate 51, i.e., in the plate like flat part 57 of the header plate 51, are formed numerous through holes 57a as illustrated in FIG. 1. Into the numerous through holes 57a are plugged the inlet end parts of the plurality of condensing tubes 38 and the outlet end parts of the plurality of supercooling tubes 40. On the edge of the opening side of the tank plate 52 are partly formed a plurality of claw like engagement parts 58 for fixingly engaging the outside surface of the edge of the opening side of the header plate 51 by crimping, as illustrated in FIG. 5.

Figure 6A:
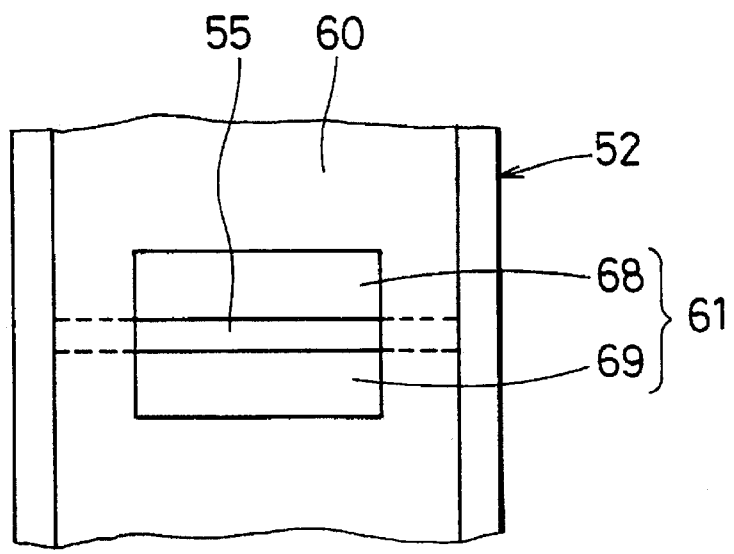
FIG. 6A is a plan views illustrating the circumference of the first through hole in the tank plate of the modulator integrated type refrigerant condenser of the first embodiment according to the present invention.

Incidentally, on the outside part of the right side header 32 in the width direction of the core 30, i.e., on the back wall of the tank plate 52, is formed a projection part 60 having an arc shaped cross section and extending in the longitudinal direction of the right side header 32 as a joint part for joining the modulator 33 by brazing. As illustrated in FIG. 6A, in a place of this projection part 60 corresponding to the separator 55, i.e., in the lower part of the projection part 60, is made a first through hole 61 having roughly square shaped cross section and boring through the projection part 60 from the inside to the outside thereof.

The modulator 33 is a second pipe body according to the present invention. This modulator 33 has a second internal space 62 extending in the height direction (vertical direction) of the core 30 and directly connected to the right side header 32 in the width direction of the core 30. The second internal space 62 having an internal volume of 150 to 200 cm$^3$ is a gas-liquid separating means for separating the refrigerant flowed thereinto from the upper side communication chamber 53 of the right side header 32 into gas refrigerant and liquid refrigerant and discharging only the liquid refrigerant into the lower communication chamber 53 of the right side header 32. Over the opening parts of the upper end part and lower end part of the modulator 33 are fitted roughly disc shaped caps 63 respectively. These caps 63 are blockading means for blockading the opening parts of the upper end part and lower end part of the modulator 33 respectively.

On the inside part of the modulator 33 in the width direction of the core 30, i.e., on the side wall of the modulator 33 on the side of the core 30, as illustrated in FIG. 1, is formed a recess part 64 having a reverse arc shaped cross section and extending in the longitudinal direction of the modulator 33 as a part to be mounted on the projection part 60 of the header plate 51.

On the upper side part of the recess part 64 is formed a square shaped upper side level difference or protruding part 65 by press working or other means so as to be built up by approximately 1 mm, for example, to the right side from the other part of the recess part 64. This upper side level difference part 65 has a surface area of 200 mm², for example, and joined to the projection part 60 of the header plate 51 in surface contact therewith by brazing.

Figure 6B:
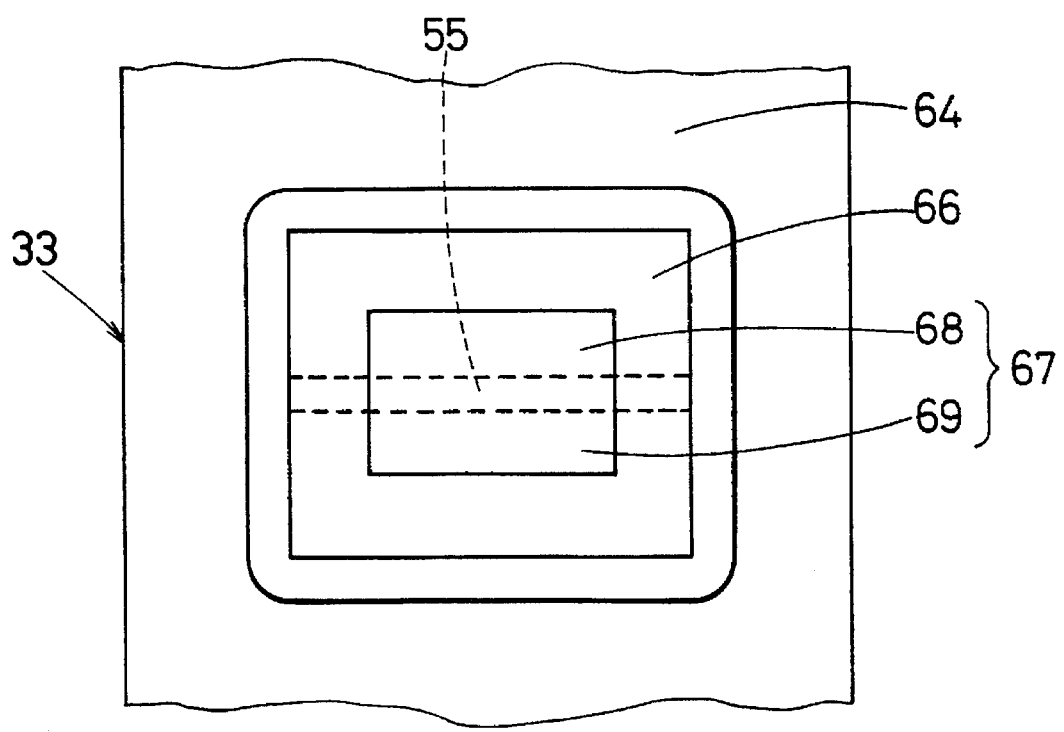
FIG. 6B is a plan view illustrating the circumference of the second through hole in the modulator of the modulator integrated type refrigerant condenser of the first embodiment according to the present invention.

In a place of this recess part 64 corresponding to the separator 55 and the first through hole 61, i.e., in the lower part of the recess part 60, is made a lower side level difference or protruding part 66 by press working or other means so as to be built up to the side of the right side header 32 from the other part of the recess part 64 by roughly the same height as that of the upper side level difference part 65. This lower side level difference part 66 has a surface area of 200 mm², for example, and joined to the projection part 60 of the header plate 51 in surface contact therewith by brazing. On the other hand, as illustrated in FIG. 6B, in a place of this recess part 64 corresponding to the separator 55 (indicated by broken line in this figure), i.e., in the lower part of the lower side level difference part 66, is made a second through hole 67 having roughly square shaped cross section and boring through the lower level difference part 66 from the inside to the outside thereof. Therefore, the lower side level difference part 66 is formed into a squarely annular shape so as to enclose the circumference of the second through hole 67.

Incidentally, the first through hole 61 and the second through hole 67 are, as illustrated in FIGS. 6A and 6B, separated into an upper side part and a lower side part respectively by the separator 55. The upper side parts of the first through hole 61 and second through hole 67 are jointly used as a refrigerant inlet passage 68 of the modulator 33, while the lower side parts of the first through hole 61 and second through hole 67 are jointly used as a refrigerant outlet passage 69 of the modulator 33. The refrigerant inlet passage 68 is a communication passage for guiding the refrigerant from the upper side communication chamber 53 into tie internal space 62, while the refrigerant outlet passage 69 is a communication passage for guiding the refrigerant from the second internal space 62 into the lower communication chamber 54.

[Manufacturing Method for the First Embodiment]

The assembling method for the modulator integrated type refrigerant condenser 3 according to this embodiment will now be described referring to FIGS. 1 and 5 to 8.

In this embodiment, the plurality of condensing tubes 38 and the plurality of supercooling tubes 40 are formed into a specified shape by extruding aluminum alloy or other metal having high corrosion resistance and high heat conductivity.

Figure 7:
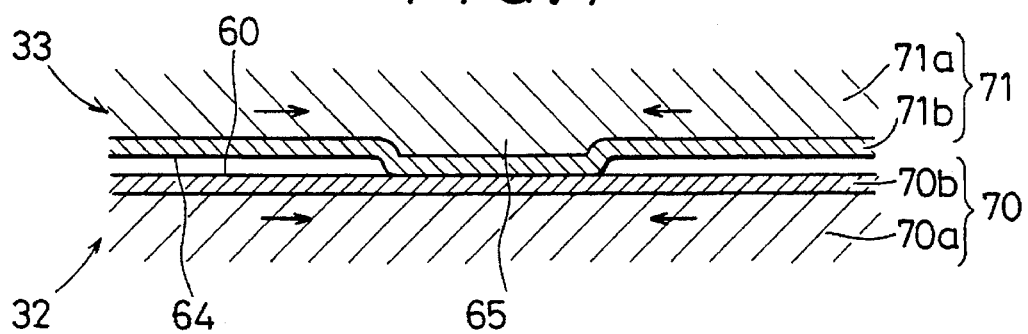
FIG. 7 is a cross-sectional view illustrating the main part of the right side header and modulator of the modulator integrated type refrigerant condenser of the first embodiment according to the present invention.

The tank plate 52 of the right side header 32 is, as illustrated in FIG. 7, formed into a specified shape by press working a flat brazing sheet 70 made of a metal plate 70a of aluminum alloy or other metal having high corrosion resistance and clad on one side with a brazing material (e.g., aluminum brazing filler metal) 70b. Incidentally, in addition to the tank plate 52 of the right side header 32, the header plate 42 and tank plate 43 of the left side header 31, the header plate 51 of the right side header 32, the side plates 36 and 37, the plurality of corrugate fins 39 and 41 and the caps 47, 56 and 63 are also formed into respective specified shapes by press working a flat plate.

On the other hand, the modulator 33, as illustrated in FIG. 7, is formed into a cylindrical body by bending a flat plate like brazing sheet 71 made of a metal plate 71a having high corrosion resistance and clad on one side with a brazing material (e.g., aluminum brazing filler metal) 71b and sticking both edges 33a and 33b (FIG. 1). Following this, the recess part 64, the upper side level difference part 65, the lower side level difference part 66 and the second through hole 67 are formed by press working into respective specified shapes.

Firstly, on one side plate 37 is formed the supercooling part 35 by alternatingly stacking up the plurality of corrugate fins 41 and the plurality of supercooling tubes 40. Subsequently, on the supercooling part 35 is formed the condensing part 34 by alternatingly stacking up the plurality of corrugate fins 39 and the plurality of condensing tubes 38. Furthermore, on the condensing part 34 is stacked up with the other side plate 36.

Then, for temporary assembly of the core 30, the left end parts of the plurality of condensing tubes 38 and plurality of supercooling tubes 40 are plugged into the respective through holes made in the flat part of the header plate 42, and then the right end parts thereof are plugged into the respective through holes 57a made in the flat part 57 of the header plate 51. In this process, in order to hold the shape of the core 30, a wire (not illustrated) or other jig is used to tighten both the side plates 36 and 37.

Next, in the state that the separator 46 is set in the specified position, the opening side of the header plate 42 and the opening side of the tank plate 43 are joined to each other, and the plurality of claw like engagement parts 48 partly formed on the edge of the opening side of the tank plate 43 are crimped. As a result, by fixingly engaging these claw like engagement parts 48 with the outside surface of the edge on the opening side of the header plate 42, the cylindrical left side header 31 is temporarily assembled on the left end part of the core 30.

Subsequent to the above, the projection part 60 of the tank plate 52 is fitted into the recess part 64 of the modulator 33 and thereby the tank plate 52 and the modulator 33 are joined to each other. In the state that the separator 55 is caught in the specified place (a place corresponding to the first through hole 61), the opening side of the header plate 51 and the opening side of the tank plate 52 are joined to each other and the plurality of claw like engagement part 58 partly formed on the edge of the opening side of the tank plate 52 are caulked. As a result, by fixingly engaging these claw like engagement parts 58 with the outside surface of the edge on the opening side of the header plate 51, the roughly cylindrical right side header 32 and the modulator 33 are temporarily assembled on the right end part of the core 30.

Here, the first through hole 61 made in the projection part 60 of the tank plate 52 and the second through hole 67 made in the recess part 64 of the modulator 33 are separated into the upper direction and lower directions respectively by the installation of the modulator 33, the right side header 32 and the separator 55. Accordingly, the upper side parts of the first through hole 61 and second through hole 67 jointly constitute the refrigerant inlet passage 68 and the lower side parts of the first through hole 61 and second through hole 67 jointly constitute the refrigerant outlet passage 69.

Next, the opening parts formed on the upper and lower end parts of the left side header 31, right side header 32 and modulator 33 are closed with the caps 47, 56 and 63 respectively, and then the modulator integrated type refrigerant condenser 3 is assembled.

Then, as illustrated in FIG. 7, powder flux is applied to the surface of the modulator integrated type refrigerant condenser 3 by means of spraying or brushing so that the brazing materials 70b and 71b can evenly wet all over the surface of the modulator integrated type refrigerant condenser 3, and then each brazing part of the modulator integrated type refrigerant condenser 3 is brazed by the vacuum integrated brazing method. During this vacuum integrated brazing, the brazing materials 70b and 71b are heated, melted and flows to each brazing part.

Figure 8:
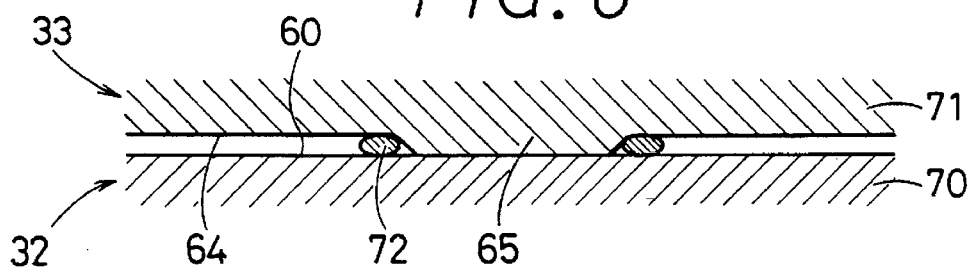
FIG. 8 is a cross-sectional view illustrating the main part of the right side header and modulator of the modulator integrated type refrigerant condenser of the first embodiment according to the present invention.

Accordingly, the heated and melted brazing materials 70b and 71b flow into between the projection part 60 of the tank plate 52 of the right side header 32 and the modulator 33. Particularly, the heated and melted brazing materials 70b and 71b intensively flow, as illustrated in FIG. 7, into between the projection part 60 of the tank plate 52 of the right side header 32 and the upper side level difference part 65 and lower side level difference part 66 respectively, i.e., into the surface contacting part between the right side header 32 and the modulator 33, from the circumference of the upper side level difference part 65 and lower level difference part 66 of the recess part 64 of the modulator 33 driven by the surface tension. Only the level difference part 65 is shown in FIG. 7, however the level difference part 66 is also formed as the same way as the level difference part 65. On the other hand, as illustrated in FIG. 8, as flux 72 is apt to pool at the upper side level difference part 65 and lower side level difference part 66, the brazing materials 70b and 71b on this surface contacting part are apt to be activated. As a result, the surface contacting part between the surface of the projection part 60 of the tank plate 52 and the upper side level difference part 65 and lower side level difference part 66 of the modulator 33 are exactly brazed. By using the above steps, all the brazing parts including the surface contacting part between the projection part 60 of the tank plate 52 and the recess part 64 of the modulator 33 are joined, and the manufacture of the modulator integrated type refrigerant condenser 3 is completed as illustrated in FIGS. 1, 5 and 6.

Figure 9:
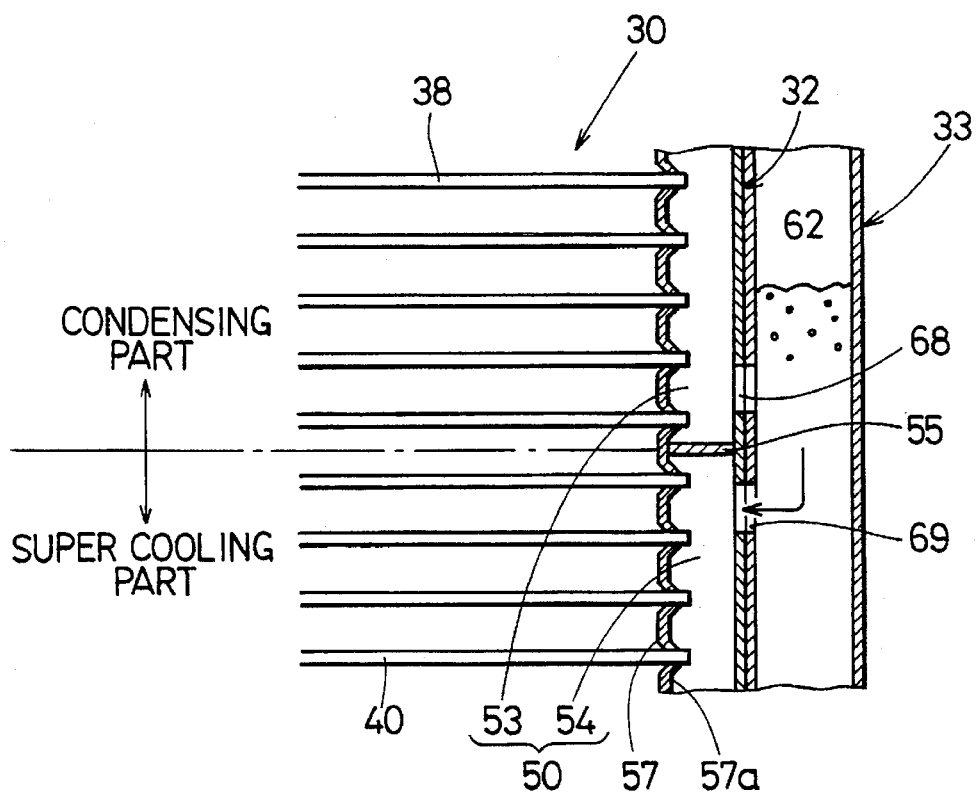
FIG. 9 is an operational principle view illustrating the operational principle of the modulator integrated type refrigerant condenser of the first embodiment according to the present invention.

Now, the mode of operation of this embodiment will briefly be described referring to FIGS. 1 to 9. Here, FIG. 9 is an operational principle view of the main part of the modulator integrated type refrigerant condenser 3.

When the operation of the automotive air conditioner starts, the electromagnetic clutch 13 is electrically energized and the refrigerant compressor 2 is rotatably driven by the engine 9 through the pulley 10, the belt 11, the pulley 12 and the electromagnetic clutch 13. The high-temperature, high-pressure refrigerant compressed within the refrigerant compressor 2 and discharged therefrom flows through the inlet pipe 43a into the inlet side communication chamber 44 of the left side header 31. The gas refrigerant flowed into the inlet side communication chamber 44 is distributed therein into the plurality of condensing tubes 38.

The gas refrigerant distributed into the plurality of condensing tubes 38 flows therethrough. While flowing through the plurality of condensing tubes 38, the gas refrigerant is heat exchanged with the outdoor air through the corrugate fins 39 and mostly condensed into liquid refrigerant leaving a part thereof remaining in the gas phase state. The refrigerant in the gas-liquid two-phase state flows from the plurality of condensing tubes 38 into the upper side communication chamber 53 of the right side header 32.

The refrigerant in the gas-liquid two-phase state flowed into the upper side communication chamber 53 is collected once and then flows through the two refrigerant inlet passage 68 into the second internal space 62 of the modulator 33. In this arrangement, the gas refrigerant in the fine bubble state flowed out of the downstream end of the plurality of condensing tubes 38 is collected within the upper side communication chamber 53 and turned into the gas refrigerant in the large bubble state. Accordingly, the gas refrigerant receives the effect of buoyancy to a large extent.

At this time, as it is so arranged by the separator 55 that the refrigerant flowed from the plurality of condensing tubes 38 into the right side header 32 makes a U-turn and flows into the plurality of supercooling tubes 40, the gas-liquid two-phase refrigerant is separated into gas refrigerant and liquid refrigerant and the gas refrigerant is collected at one place (inside). In this arrangement, the gas refrigerant in the fine bubble state turns into the gas refrigerant in the large bubble state, and accordingly the gas refrigerant receives the effect of buoyancy to a larger extent and so much so that the separation of the refrigerant into gas refrigerant and liquid refrigerant is facilitated.

In other words, as the refrigerant inlet passage 68 is opened at the lower part of the upper side communication chamber 53 and the refrigerant inlet passage 68 and the refrigerant outlet passage 69 are comparatively close in geography, when the refrigerant in the gas-liquid two-phase state flows through the refrigerant inlet passage 68, the second internal space 62 and the refrigerant outlet passage 69 in this order, the liquid refrigerant having larger specific gravity is driven to the back wall side part of the modulator 33 by centrifugal force and the gas refrigerant in the bubble state having smaller specific gravity shifts to the modulator 33 on the side of the core 30.

Accordingly, as the refrigerant in the gas-liquid two-phase state is efficiently separated into gas refrigerant and liquid refrigerant within the modulator 33, the gas refrigerant which could not completely be condensed pools at the upper part of the modulator 33 and the liquid refrigerator pools at the lower part thereof. Therefore, if the refrigerating cycle 1 is filled with the refrigerant for the quantity sufficient to form a gas-liquid interface within the modulator 33, only the liquid refrigerant which has no subcool flows from the two refrigerant outlet passage 69 located at the lower part of the modulator 33 into the lower side communication chamber 54. The refrigerant flowed into the lower side communication chamber 54 is distributed therein into the plurality of supercooling tubes 40.

The refrigerant distributed into the plurality of supercooling tubes 40 are heat exchanged with the outdoor air through the corrugate fins 41 and supercooled into the liquid refrigerant having subcool while flowing through these supercooling tubes 40, turned into refrigerant having subcool, and then flows into the outlet side communication chamber 45 of the left side header 31.

The liquid refrigerant flowed into the outlet side communication chamber 45 flows through the outlet pipe 43b and the sight glass 4 into the expansion valve 5. Incidentally, as the expansion valve 5 is supplied with liquid refrigerant in single phase containing no gas refrigerant, there is no possibility that the refrigerant circulating quantity of the liquid refrigerant flowing into the expansion valve 5 is reduced. As a result, a sufficient quantity of refrigerant in the atomized state is supplied into the refrigerant evaporator 6 and therefore the deterioration in the refrigerating ability of the automotive air conditioner can be prevented.

[Effect of the First Embodiment]

As described above, in the refrigerating cycle 1 of the automotive air conditioner, the gas refrigerant in the bubble state before separation is not driven from the refrigerant outlet passage 69 of the modulator 33 to the plurality of supercooling tubes 40, the sight glass 4 and the expansion valve 5, whereby the supercooling part 35 can effectively be operated and the occurrence of the refrigerant flowing sound within the expansion valve 5 can be prevented.

Incidentally, in this embodiment, as the sight glass 4 is connected on the downstream side from the supercooling part 35, there is no need to ensure the gas-liquid separability within the modulator 33. Therefore, the internal volume of the modulator 33, i.e., the cross section of the second internal space 62, can only be as much as the allowance for the refrigerant variation and refrigerant leakage due to the load variation in the refrigerating cycle 1.

Furthermore, as the supercooling part 35 is provided on the downstream side of the second internal space 62 of the modulator 33, even if the gas-liquid separation within the second internal space 62 is not complete, the gas refrigerant in the bubble state can become completely extinct within the supercooling part 35. Resultantly, the internal volume of the modulator 33, i.e., the cross section of the internal space 62 can be reduced, the effective radiation area of the core 30 having the condensing part 34 and the supercooling part 35 can be enlarged in comparison with the prior art.

Moreover, in the modulator integrated type refrigerant condenser 3 according to this embodiment, the upper side level difference part 65 and lower side level difference part 66 are formed on the upper side part and lower side part of the recess part 64 of the modulator 33 respectively. In addition, the lower side level difference part 66 is formed into a squarely annular shape so as to enclose the circumference of the second through hole 67.

In the above arrangement, when the modulator 33 is attached to the tank plate 52 in brazing the surface of the projection part 60 of the tank plate 52 of the right side header 32 with the surface of the recess part 64 of the modulator 33, only the surfaces of the upper side level difference part 65 and lower side level difference part 66 contact the surface of the projection part 60. In the subsequent brazing, the heated and melted brazing materials 70b and 71b and the sprayed or brushed flux 72 intensively flow to the surface contacting part between the surface of the projection part 60 and the upper side level difference part 65 and lower side level difference part 66 and thereby the brazing materials 70b and 71b are easily activated. As a result, the tank plate 52 and the modulator 33 can exactly be brazed to each other.

Consequently, defective brazing (void) does not occur so easily at such places where defective brazing would pose a serious problem such as a place around the first through hole 61 and a place around the second through hole 67, i.e., a place around the refrigerant inlet passage 68 and a place around the refrigerant outlet passage 69, whereby the leakage of refrigerant from between the right side header 32 and the modulator 33, i.e., from the refrigerant inlet passage 68 or the refrigerant outlet passage 69, can be prevented. Also in this embodiment, as two level difference parts (the upper side level difference part 65 and the lower side level difference part 66) are provided on the recess part 64 of the modulator, as much brazing strength as required can be secured between the right side header 32 and the modulator 33.

[Second Embodiment]

Figure 10:
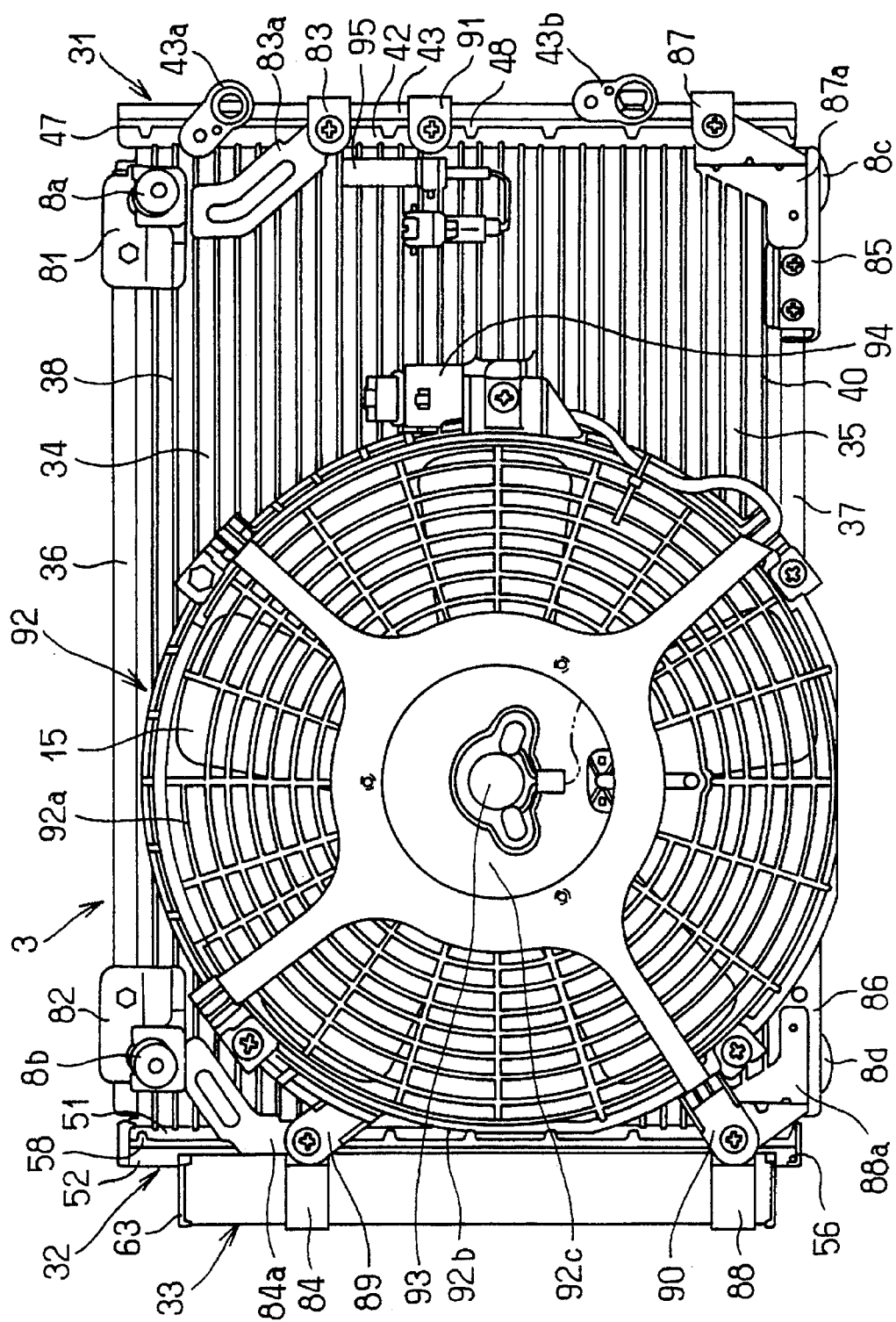
FIG. 10 is a back view illustrating the back surface side of the modulator integrated type refrigerant condenser of the second embodiment according to the present invention.
Figure 11:
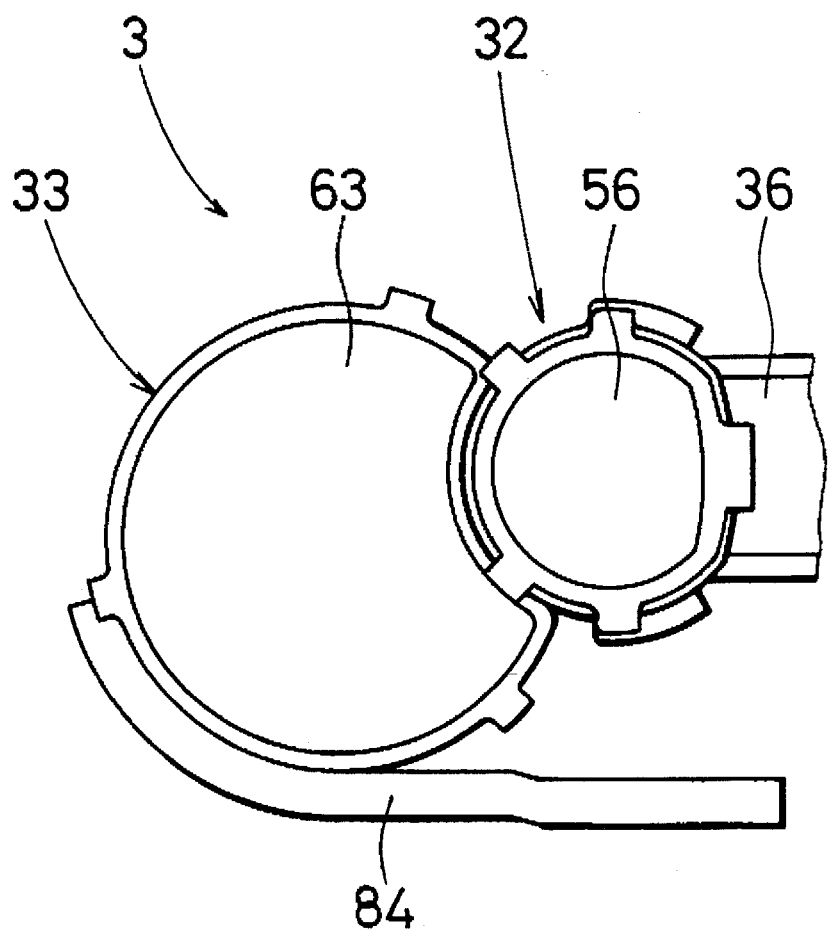
FIG. 11 is a plan view illustrating the main part of the modulator integrated type refrigerant condenser of the second embodiment according to the present invention.

FIGS. 10 and 11 illustrate the second embodiment according to the present invention. FIG. 10 illustrates the back side of the modulator integrated type refrigerant condenser 3, and FIG. 11 illustrates the main part of the modulator integrated type refrigerant condenser 3. To the modulator integrated type refrigerant condenser 3 are attached mounting brackets 81 to 91.

The mounting brackets 81 and 82 are mounting means for mounting the modulator integrated type refrigerant condenser 3 into the engine room 8 of the vehicle by connecting the left and right end parts of the side plate 36 with the supporting elements 8a and 8b on the body side of the vehicle respectively.

The mounting brackets 83 and 84 connect the mounting brackets 81 and 82 and the left side header 31 and the modulator 33 through stays 83a and 84a respectively by brazing or fastening means.

The mounting brackets 85 and 86 are mounting means for mounting the modulator integrated type refrigerant condenser 3 into the engine room 8 of the vehicle by connecting the left and right end parts of the side plate 37 with the supporting elements 8c and 8d on the body side of the vehicle respectively. The mounting brackets 87 and 88 connect the mounting brackets 85 and 86 and the left side header 31 and the modulator 33 through stays 87a and 88a respectively by brazing or fastening.

The mounting brackets 89 and 90 is to rotatably support the cooling fan 15 and fix a fan shroud 92 which stabilizes the outdoor air flow and is connected to the stays 84a and 88a by brazing or fastening.

The fan shroud 92 is made by integrally forming a protective netting part 92a for protecting human hands from the cooling fan 15 or protecting the cooling fan from foreign matters, a shroud part 92b for covering the circumference of the cooling fan 15, and a holding part 92c for holding an electric motor 93 for the cooling fan 15 by means of molding a resin material. To the shroud part 92b is attached a connector 94 for conducting electric power to the electric motor 93.

Incidentally, to the mounting bracket 91 connected to the left side header 31 by brazing or fastening is attached an outdoor air temperature sensor 95 for sending outdoor air temperature signals to a controller of the automotive air conditioner.

As described above, there is a case where the mounting brackets 87 and 88 are attached to the modulator 33 of the modulator integrated type refrigerant condenser 3 as well as to the left side header 31, right side header 32 and side plate 36 of the modulator integrated type refrigerant condenser 3. For this reason, sufficiently strong brazing is required for the right side header 32 and the modulator 33. This requirement can be satisfied by brazing the right side header 32 and the modulator by providing the upper side level difference part 65 and the lower side level difference part 66 to the recess part 64 of the modulator 33 as seen in this embodiment.

[Modification]

In this embodiment, the present invention is incorporated into the refrigerating cycle 1 of the automotive air conditioner. The present invention, however, may be incorporated into the refrigerating cycle of an air conditioner for rolling stock, seacraft or aircraft. The present invention may also be incorporated into the refrigerating cycle of a stationary air conditioner for household or industrial use. Particularly, the present invention can most suitably be incorporated into the refrigerating cycle of an air conditioner for a vehicle in which the refrigerant circulating quantity within the refrigerating cycle is subject to variation.

Also, in this embodiment, though outdoor air blown by the cooling fan 15 is used as a heat medium, gas such as indoor air or liquid such as cooling water may be used instead. Furthermore, in this embodiment, though the supercooling part 35 is provided within the core 30, the supercooling part 35 may not be provided within the core 30.

Moreover, for the refrigerant flow within the condensing part 34 and the supercooling part 35, the number of turns may be increased or decreased by eliminating the separators 46 and 55 or by increasing the number thereof to be more than two. However, the inlet of the modulator 33 should be provided on the side of the outlet of the condensing part 34, that is, when the condensing part 34 is connected to the left side header 31, the modulator 33 should be connected to the left side header 31. To add, a drier may be provided within the modulator 33.

Again, in this embodiment, the first refrigerant inlet passage 68 and the second refrigerant outlet passage 69 are formed by separating the one first through hole 61 and the one second through hole 67 with the existence of the separator 55. Instead of this, however, the refrigerant inlet passage 68 and the refrigerant outlet passage 69 may separately and independently be formed by the two first through holes 61 and the two second through holes 67 respectively.

Also, in this embodiment, though the heat exchanger of corrugate fin tube type is used, a heat exchanger of plate fin tube type may be used instead. In addition, the modulator integrated type refrigerant condenser 3 may be installed in a place other than the engine room 8 and the radiator 14, such as within a duct of an air conditioner.

Furthermore, in this embodiment, though two level difference parts are provided, three or more level difference parts may be provided. It may also be arranged that a flat part is provided to a roughly cylindrical header, a flat part is provided to a roughly cylindrical modulator, and the flat part of the header and the flat part of the modulator are joined by brazing. In this case, however, it is advisable that either of the flat part of the header or the flat part of the modulator is provided with a level difference part.

Moreover, in this embodiment, though the first pipe body is used for the roughly cylindrical right side header 32, the first pipe body may be used for the roughly cylindrical modulator 33 instead. It may also be arranged that the first pipe body is formed into a roughly triangular or more polygonal pipe shape.

Still more, in this embodiment, though the second pipe body is used for the rough cylindrical modulator 33, the second pipe body may be used for the roughly cylindrical right side header 32 instead. It may also be arranged that the second pipe body is formed into a roughly triangular or more polygonal pipe shape.

Again, in this embodiment, though the first through hole 61 and the second through hole 67 are formed into respective roughly square shapes, the first through hole 61 and the second through hole 67 may be formed into respective circular shapes, elliptic shapes, oval shapes or other shapes instead.

In addition, in this embodiment, the left side header 31 and the right side header 32 are formed into respective roughly cylindrical shapes by processing two flat plates into respective specified shapes and then stuck each other. Instead, however, the left side header 31 and the right side header 32 may be formed into respective roughly cylindrical shapes by bending one flat plate respectively.

Besides, in this embodiment, though the modulator 33 is formed into a roughly cylindrical shape by bending one flat plate, the modulator 33 may be formed into a roughly cylindrical shape by processing two flat plates into a specified shape and then stuck each other.

Finally, in this embodiment, though the square shaped upper side level difference part 65 and the squarely annular lower level difference part 66 are provided as level difference parts, the level difference parts of circular, elliptic, oval or polygonal shapes such as triangular shapes in plane shape may be provided as level difference parts instead. Furthermore, if at least one level difference part is provided so as to enclose the second through hole 67, any number of level difference parts may be provided. Still furthermore, a level difference part may be provided to the surface of the first pipe body in opposition to the level difference part of the second pipe body.

In this embodiment, as defective brazing can be prevented at such places where defective brazing would pose a serious problem such as a place around the first through hole 61 and a place around the second through hole 67, the leakage of refrigerant from between the joining part of the first pipe body and the joined part of the second pipe body can be prevented.

What is claimed is:

1. A refrigerant condenser comprising:

a first pipe body having a first refrigerant passage therein and including a joining part formed partially on an outer peripheral surface thereof and a first through hole penetrating said joining part and in fluid communication with said first refrigerant passage; and a second pipe body having a second refrigerant passage therein, and including a joined part formed partially on an outer surface thereof and a second through hole penetrating said joined part and in fluid communication with said second refrigerant passage, said second through hole communicating with said first communicating hole, wherein, at least one of said first pipe body and said second pipe body is provided with a protruding surface protruding outwardly around a periphery of an associated through hole, said protruding surface protrudes towards the other of said pipe body so as to contact the other pipe body, said protruding surface being constructed and arranged to provide a sealed joint when said joining part of said first pipe body is joined with said joined part of said second pipe body.

2. The refrigerant condenser according to claim 1, wherein each of said first and second pipe bodies is clad with a brazing material, said first and second pipe bodies being joined by brazing at said protruding surface.

3. The refrigerant condenser according to claim 1, wherein said second pipe body includes said protruding surface.

4. The refrigerant condenser according to claim 1, wherein at least one of said joining part of said first pipe body and said joined part of said second pipe body protrudes toward the other part.

5. The refrigerant condenser according to claim 3, wherein said protruding surface is disposed at two or more places on said second pipe body.

6. The refrigerant condenser according to claim 1, further comprising a core in which a plurality of tubes are laid out in parallel with each other for flowing refrigerant therethrough, wherein said first pipe body constitutes a roughly cylindrical header connected to an end part of the plurality of tubes, said header includes a first internal space extending in the height direction of said core, said second pipe body constitutes a roughly cylindrical modulator for separating refrigerant flowed thereinto into gas refrigerant and liquid refrigerant, said modulator includes a second internal space extending in the same direction as the direction of said first internal space.

7. The refrigerant condenser according to claim 6, wherein said core has a plurality of condensing tubes for condensing and liquefying refrigerant flowing therethrough by heat exchanging the refrigerant with a heat medium and a plurality of supercooling tubes provided under said plurality of condensing tubes for supercooling refrigerant flowing therethrough by heat exchanging the refrigerant with a heat medium.

8. The refrigerant condenser according to claim 7, wherein said header has a partitioning means for dividing said first internal space into an upper side communication chamber connected to outlet end parts of said plurality of condensing tubes and a lower side communication chamber connected to inlet end parts of said plurality of supercooling tubes.

9. The refrigerant condenser according to claim 8, wherein said partitioning means is a separating means for separating said first through hole and said second through hole into a refrigerant inlet passage for guiding refrigerant from an inside of the upper communication chamber into an inside of said second internal space and a refrigerant outlet passage for guiding from an inside of the second internal space into said lower side communication chamber.

10. A refrigerant condenser comprising:
   a core having a plurality of condensing tubes for condensing and liquefying refrigerant flowing therethrough by heat exchanging the refrigerant with a heat medium, a plurality of supercooling tubes provided under said plurality of condensing tubes for supercooling refrigerant flowing therethrough by heat exchanging the refrigerant with a heat medium, and a plurality of fins disposed between said adjacent tubes;
   a header connected to end parts of said plurality of tubes, said header includes a first internal space extending in the height direction of said core, said header having a joining part in a longitudinal direction thereof and a first through hole penetrating an inner periphery side and outer periphery side of the joining part;
   a modulator separating refrigerant flowed thereinto into gas refrigerant and liquid refrigerant, said modulator including a second internal space extending in the same direction as the direction of said first internal space, said modulator having a joined part joined to said joining part of said header by brazing and a second through hole penetrating an inner periphery side and outer periphery side of said joined part and communicating with said first through hole;
   at least one protruding surface protruding from one of said joining part and said joined part around a periphery of at least one of said first through hole and said second through hole and providing surface contact between said header and said modulator to improve brazing performance and thus sealing between said header and said modulator.

11. The refrigerant condenser according to claim 10, comprising at least one additional said protruding surface disposed on one of said joining part and said joined part and performing surface contact between said header and said modulator.

12. The refrigerant condenser according to claim 10, wherein said header has a partitioning means for dividing said first internal space into an upper side communication chamber connected to outlet end parts of said plurality of condensing tubes and a lower side communication chamber connected to inlet end parts of said plurality of supercooling tubes.

13. The refrigerant condenser according to claim 12, wherein said partitioning means is a separating means for separating said first through hole and said second through hole into a refrigerant inlet passage for guiding refrigerant from an inside of the upper communication chamber into an inside of said second internal space and a refrigerant outlet passage for guiding from an inside of the second internal space into said lower side communication chamber.

14. A refrigerant condenser comprising:
   a core having a plurality of condensing tubes for condensing and liquefying refrigerant flowing therethrough by heat exchanging the refrigerant with a heat medium, a plurality of supercooling tubes provided under said plurality of condensing tubes for supercooling refrigerant flowing therethrough by heat exchanging the refrigerant with a heat medium, and a plurality of fins disposed between said adjacent tubes;
   a header connected to end parts of said plurality of tubes, said header includes a first internal space extending in the height direction of said core;
   a modulator separating refrigerant flowed thereinto into gas refrigerant and liquid refrigerant, said modulator including a second internal space extending in the same direction as the direction of said first internal space;
   at least one protruding surface protruding from one of said header and said modulator and performing surface contact between said header and said modulator so as to improve sealing between said header and modulator.

15. The refrigerant condenser according to claim 14, wherein a plurality of said protruding surfaces are disposed on one of said header and said modulator or both of said header and said modulator.

16. The refrigerant condenser according to claim 14, wherein said header has a partitioning means for dividing said first internal space into an upper side communication chamber connected to outlet end parts of said plurality of condensing tubes and a lower side communication chamber connected to inlet end parts of said plurality of supercooling tubes.

17. The refrigerant condenser according to claim 16, wherein said partitioning means is a separating means for separating said first through hole and said second through hole into a refrigerant inlet passage for guiding refrigerant from an inside of the upper communication chamber into an inside of said second internal space and a refrigerant outlet passage for guiding from an inside of the second internal space into said lower side communication chamber.

18. The refrigerant condenser according to claim 14, wherein said header has a joining part in a longitudinal direction thereof and a first through hole penetrating an inner periphery side and outer periphery side of said joining part, and said modulator has a joined part joined to said joining part of said header by brazing and a second through hole penetrating an inner periphery side and outer periphery side of said joined part and communicating with said first through hole, said at least one protruding surface protruding from one of said joining part and said joined part around at least one of said first through hole and said second through hole.

* * * * *